United States Patent
Cañizales Teran

[19]

[11] Patent Number: 6,128,203
[45] Date of Patent: Oct. 3, 2000

[54] SWITCHED CONVERTER WITH MULTIPLE REGULATED OUTPUTS

[75] Inventor: Freddy R. Cañizales Teran, Lannion, France

[73] Assignee: Alcatel, Paris, France

[21] Appl. No.: 09/261,174

[22] Filed: Mar. 3, 1999

[30] Foreign Application Priority Data

Mar. 30, 1998 [ES] Spain ..................................... 9800671

[51] Int. Cl.$^7$ ................................................. H02M 3/335
[52] U.S. Cl. .......................... 363/21; 363/67; 323/274; 323/281; 307/82; 307/58
[58] Field of Search .............................. 363/21, 274, 281, 363/67

[56] References Cited

U.S. PATENT DOCUMENTS

| | | |
|---|---|---|
| 5,144,547 | 9/1992 | Masamoto . |
| 5,162,663 | 11/1992 | Combs et al. ............................. 363/21 |
| 5,400,239 | 3/1995 | Caine . |
| 5,424,932 | 6/1995 | Inou et al. ................................. 363/21 |
| 5,455,501 | 10/1995 | Massie . |
| 5,479,087 | 12/1995 | Wright ...................................... 363/21 |

FOREIGN PATENT DOCUMENTS

| | | |
|---|---|---|
| 38 43 183 A1 | 7/1990 | Germany . |
| 4441492A | 5/1996 | Germany . |
| 9-154276 | 10/1997 | Japan . |

*Primary Examiner*—Peter S. Wong
*Assistant Examiner*—Gary L. Laxton
*Attorney, Agent, or Firm*—Sughrue, Mion, Zinn, Macpeak & Seas, PLLC

[57] ABSTRACT

A multi-output converter having a transformer with several windings, a first winding being connected to a first switching element the duty cycle of which is controlled by a control circuit. A second winding is connected to a rectifying means and to a first filtering means, including a first inductance, in order to produce a first regulated output voltage. A second output voltage, corresponding to an auxiliary output, is generated and regulated by a fourth switching element connected to a second filtering means, including a second inductance magnetically coupled to the first inductance. A control circuit controls the switching of the fourth switching element by means of a control signal obtained from a voltage present on the second winding.

12 Claims, 2 Drawing Sheets

SWITCHED CONVERTER WITH MULTIPLE REGULATED OUTPUTS

OBJECT OF THE INVENTION

The present invention relates to a switched converter with multiple outputs, of which the voltages of at least two of the outputs are regulated.

More specifically, the invention relates to a converter to convert a first voltage into at least two regulated DC voltages, where one voltage may be different from the other. Thus, one of the DC voltages is regulated in an indirect manner by means of an auxiliary switching element, the switching of which is controlled by means of a signal obtained from a winding of a transformer.

STATE OF THE ART

A multi-output converter which has at least two regulated outputs, namely one main and one auxiliary, is known through the patent U.S. Pat. No. 5,455,501, incorporated in this application by reference, which discloses a DC-DC converter comprising circuitry to generate the voltage of one main output and circuitry to generate the voltage of an auxiliary output. This latter voltage is generated as a function of the circuitry that generates the main output voltage.

The circuitry that generates the main output voltage includes a switching means and an inductance means, and the circuitry of the auxiliary output includes an inductance means complementary to that of the main output circuitry. The inductance means is referred to the main output voltage and, consequently, depends on the presence of a minimum load on the main output. In addition, part of the circuitry employed in the auxiliary output ensures that the voltage of said output is regulated within a voltage range.

Nevertheless, the circuitry used to regulate the auxiliary output voltage requires the use of a large number of elements and, moreover, its control involves a high degree of complexity, since great precision is required in the generation of control signals to control the switching of the different switching means present in the circuitry necessary to generate the two output voltages.

As a result, the regulation technique employed to regulate the voltage of an auxiliary output is complex and increases the overall cost of the multi-output converter.

Thus, in the design process of a multi-output converter, great importance is acquired by the topology employed in its design due to its influence on the overall performance of the multi-output converter, the complexity of the technique employed to regulate the voltage of an auxiliary output, since it has an influence on the performance of said output and on the overall performance of the converter.

In brief, what has been described above has an influence on the overall cost of the converter. Consequently, an optimum design of said multi-output current converter must be selected in order to limit its cost and to achieve a high performance.

CHARACTERIZATION OF THE INVENTION

An object of the present invention is to regulate the voltage of at least one main output and one second or auxiliary output of a switched converter with multiple outputs in a simple manner which implies straightforward circuitry employing few components, whereby the regulation technique used dissipates little power.

Another object is to obtain high performance at said second output and, consequently, the switched converter of this invention also presents a high performance. Thus, the overall cost of the multi-output switched converter is reduced.

The switched converter comprises a transformer formed by at least a first winding and a second winding. The first winding is connected in series with a first switching element the duty cycle of which is controlled by a control circuit, the latter generating the switching signal for said first switching element from a sample of a first voltage present on the main output.

The main output is formed by said second winding connected to rectifier means, for example a self-driving synchronous rectifier, and to first filtering means, including a first inductor, producing the first regulated output voltage.

An auxiliary output is formed by a fourth switching element connected to second filtering means, including a second inductor coupled magnetically to said first inductor, producing a second regulated output voltage. In addition, it comprises a control circuit to control the switching of said fourth switching element by means of a control signal obtained from the voltage present on said second winding.

BRIEF DESCRIPTION OF THE FIGURES

A more detailed explanation of the invention is provided in the following description, based on the attached figures, in which.

DESCRIPTION OF THE INVENTION

Figure 1:
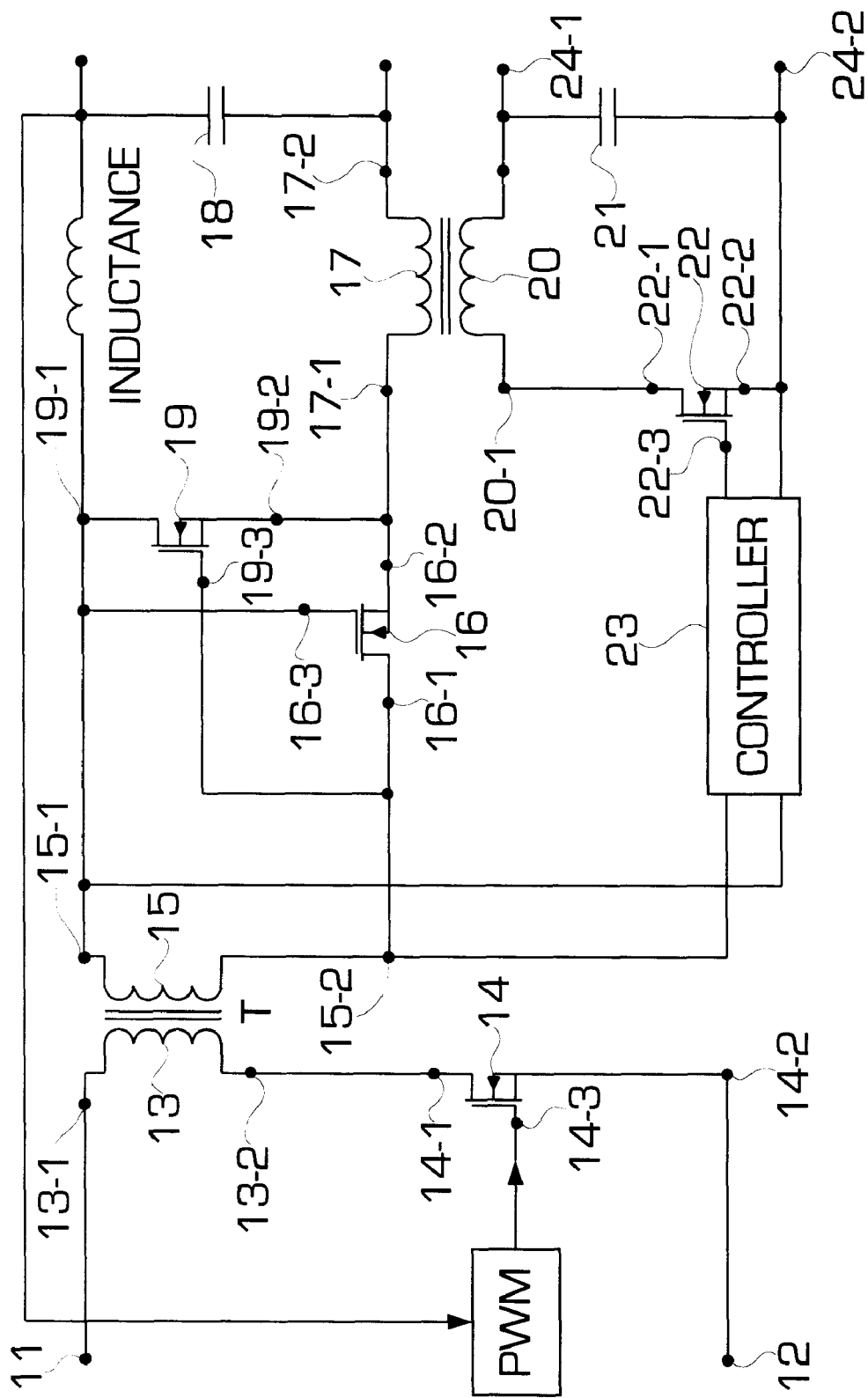
FIG. 1 shows an electrical diagram of a switched converter with multiple outputs according to the invention.

FIG. 1 shows a switched converter with multiple outputs according to the invention, which presents at least two regulated output voltages, corresponding a first voltage to a main output and a second voltage to an auxiliary output, respectively.

A voltage source is connected to input nodes 11, 12 of the multi-output switched converter, in order to be converted into at least two regulated DC voltages. Said nodes 11, 12 are included on the primary side of a transformer T, included in said multi-output converter. Thus, the input node 11 is connected to a terminal 13-1 of a first winding 13 of the transformer T, for example.

The other terminal 13-2 of the first winding 13 is connected in series with a terminal 14-1 of a first switching element 14, for example a field effect transistor MOSFET. Thus, the drain 14-1 of said MOSFET 14 is connected to the terminal 13-2 of the first winding 13. The source 14-2 of said MOSFET is connected to the input node 12.

A control circuit PWM, for example a pulse width modulator, in accordance with a signal obtained at the main output, generates a signal to switch alternately the MOSFET 14 between turn off and turn on, that is the switching or duty cycle of said MOSFET 14 presents two parts, one with a fly-back configuration and the other with a forward configuration. This last signal is applied to the gate 14-3 of the MOSFET 14.

The main output is formed by a second winding 15 of the transformer T, on the secondary side of said transformer T, connected to rectifier means, for example a self-driving synchronous rectifier, and first filtering means, for example a first inductance means 17 connected to a first capacitor 18.

When the MOSFET 14 is turn on, that is in the forward part of each duty cycle of said MOSFET 14, a current flows through the first winding 13, inducing a current flow in the secondary side of the transformer T.

The current flows through the second winding 15 and a second switching element 16, also a field effect transistor MOSFET for example, and through the first inductance means 17, charging the first capacitor 18 and providing the first regulated output voltage, corresponding to the main output of the converter.

A terminal 15-2 of the second winding 15 is connected to the drain 16-1 of the second MOSFET 16, the source 16-2 is connected to the terminal 17-1 of the first inductor 17, and its gate 16-3 is connected to the terminal 15-1 of the second winding 15.

The second MOSFET 16 together with a third switching element 19, as well as a field effect transistor MOSFET, form the self-driving synchronous rectifier, whereby the rectifier arm is constituted by the second MOSFET 16 and the free wheeling arm is constituted by the third MOSFET 19.

Thus the drain 19-1 of the third MOSFET 19 is connected to the terminal 15-1 of the second winding 15, the gate 19-3 to the other terminal 15-2 of the same winding 15 and the source 19-2 to the terminal 17-1 of the first inductance 17.

When the first MOSFET 14 is turn off, that is in the fly-back part of the duty cycle, the current ceases to flow through the first winding 13, and the energy stored in the first inductor 17 produces a current flow through the third MOSFET 19 and the first capacitor 18, maintaining the value of the first output voltage of the main output. Consequently, the switched multi-output converter of the invention presents a forward topology with the outputs isolated.

The values of the first inductor 17 and of the first capacitor 18, which form the first filtering means, are chosen by the designer in order to obtain the value of voltage required at the main output and, in addition, for filtering said output voltage.

The auxiliary output includes a second inductor 20 magnetically coupled to the first inductor 17, for example on the same core, in such a way that a terminal 20-2 is connected to a terminal of a second capacitor 21 to form an output node 24-1 of the auxiliary output.

A fourth switching element 22, for example a field effect transistor MOSFET, is connected to the second inductor 20. Thus, the drain 22-1 of the fourth MOSFET 22 is connected to the terminal 20-1 of said inductor 20 and its source 22-2 is connected to a terminal of the second capacitor 21 to form the other output node 24-2. Likewise, said source 22-2 is connected to the terminal 15-1 of the second winding 15. Thus, the second output voltage at the auxiliary output is regulated by means of the coupling of the first inductor 17 and the second inductor 20, obtaining the regulated output voltage across the output nodes 24-1, 24-2. Frequently, the power supplied through the auxiliary output is less than the power supplied through the main output.

The switching to turn off and to turn on the fourth MOSFET 22 is controlled by means of a control signal generated by a control circuit 23. Said control signal is applied to the gate 22-3 of the fourth MOSFET 22. The control circuit 23 obtains the control signal from the alternating voltage waveform present on the second winding 15.

Figure 2:
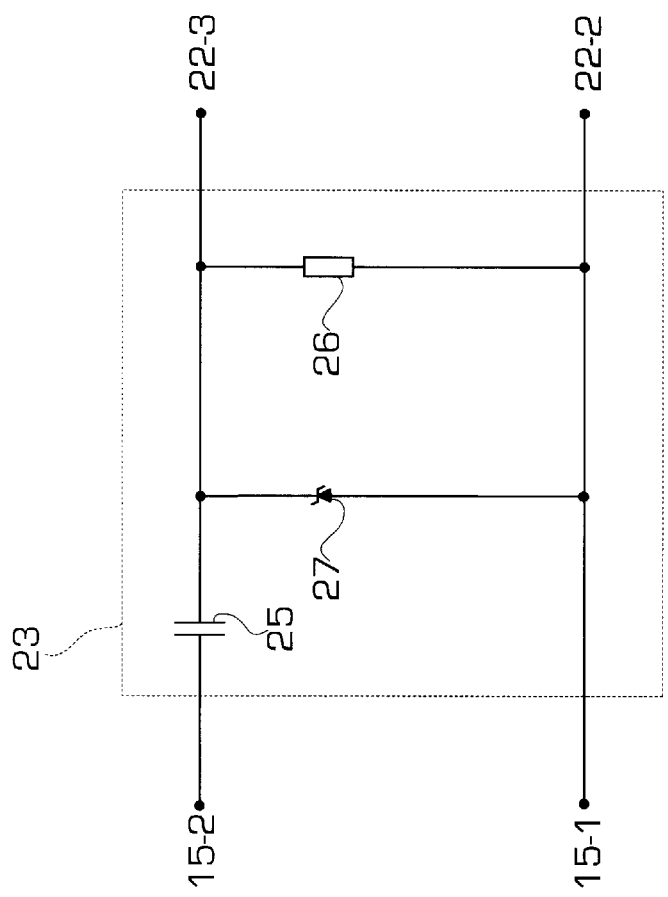
FIG. 2 shows an electrical diagram of an embodiment of a control circuit according to the invention.

FIG. 2 shows a preferred embodiment of the control circuit 23, which includes a third capacitor 25 such that one of its terminals is connected to the terminal 15-2 of the second winding and its other terminal is connected to the gate 22-3 of the fourth MOSFET 22. The cathode of a Zener diode 27 is connected to the terminal 22-3 of the fourth MOSFET 22, and the anode of said Zener diode 27 is connected to the terminal 22-2 of said MOSFET 22. It also includes a first resistance 26 connected across the terminals 22-3 and 22-2 of said MOSFET 22.

When the second MOSFET 16 turns on, the third capacitor 25 is charged, the fourth MOSFET 22 being turn off. The capacitor 25 discharges through the first resistance 26, corresponding to the period of conduction of the fourth MOSFET 22 since the control signal is applied at its gate 22-3, this period coinciding with that of conduction of the third MOSFET 19.

When the fourth MOSFET 22 is turn off, the second capacitor 21 supplies the voltage to the output nodes 24-1, 24-2. The Zener diode 27 protects the fourth MOSFET 22 against voltage peaks, for example surge voltages.

The multi-output current converter presents at least two outputs with their voltages regulated, the main output having a forward configuration and its output voltage being regulated by controlling the switching of the first MOSFET 14, and the auxiliary output having a fly-back configuration, its output voltage being regulated by means of the coupling between the first inductor 17 and the second inductor 20.

Figure 3:
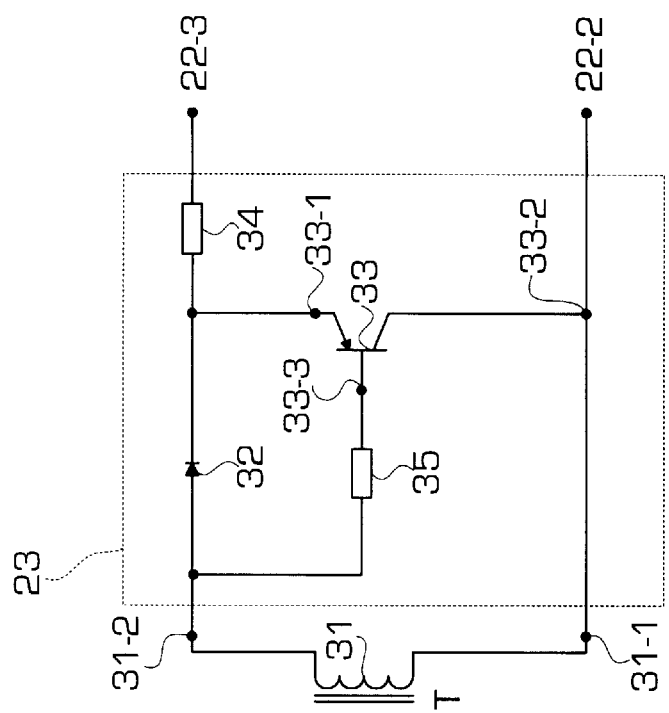
FIG. 3 shows an electrical diagram of another embodiment of the control circuit according to the invention.

If it is necessary to isolate said outputs, the control circuit 23 can obtain the control signal from the alternating voltage waveform present on a third winding 31, this implementation being shown in FIG. 3. Therefore, the two outputs are isolated.

FIG. 3 shows another embodiment of the control circuit 23. Thus, when the first MOSFET 14 turns on, a current flows through a diode 32 and a second resistance 34, the control signal being applied to the terminal 22-3 of the fourth MOSFET 22, which comes into conduction.

Nevertheless, when the first MOSFET 14 is turn off, a current flows through the circuit formed by the second resistance 34, the terminal 33-1 and the terminal 33-3 of a fifth switching element 33, a third resistance 35 and the third winding 31, the fourth MOSFET 22 passing into the turn off state. Therefore, the auxiliary output has its output voltage regulated.

What is claimed is:

1. A switched converter with multiple regulated outputs comprising:

a transformer comprising a first winding and a second winding, wherein said first winding is connected to a first switching element the duty cycle of which is controlled by a first control circuit and said second winding is connected to a self-driven synchronous rectifier and to a first filter comprising a first inductance, whereby a first regulated output voltage is produced;

wherein said switched converter further comprises a fourth switching element connected to a second filter comprising a second inductance magnetically coupled to said first inductance, whereby a second regulated output voltage is produced, and said fourth switching element is also connected to a second control circuit operable to control switching of said fourth switching element by using a control signal obtained from a voltage present on said second winding.

2. A switched converter according to claim 1, wherein said control circuit comprises a capacitor connected between a terminal of said second winding and a first terminal of said fourth switching element, a cathode of a Zener diode is connected to said first terminal and an anode of said Zener diode is connected to a second terminal of said fourth switching element and in parallel with said Zener diode is connected a first resistance.

3. A switched converter according to claim 1, wherein said transformer also comprises a third winding connected to said control circuit thereby producing said control signal as a function of an alternating voltage present on said third winding.

4. A switched converter according to claim 3, wherein said control circuit comprises a diode with an anode connected to a first terminal of said third winding (31) and a cathode connected through a second resistance to the first terminal of said fourth switching element, a first terminal of a fifth switching element is connected through a fifth resistance to the first terminal of said third winding and a second terminal of said fifth switching element is connected to a second terminal of said third winding.

5. A switched converter according to claim 1, further comprising a third inductance located between a drain of said third switching element and a first capacitor included in said first filter.

6. A switched converter according to claim 1, wherein said first control circuit is a Pulse-Width Modulator (PWM) circuit.

7. A switched converter according to claim 1, wherein said second control circuit is not a Pulse-Width Modulator (PWM) circuit.

8. A switched converter according to claim 1, wherein said self-driven synchronous rectifier comprises a second and a third switching element wherein said second and third switching elements are power switching transistors.

9. A switched converter with multiple regulated outputs comprising:

a transformer comprising a first winding and a second winding, wherein said first winding is connected to a first switching element the duty cycle of which is controlled by a pulse-width modulator control circuit and said second winding is connected to a self driven synchronous rectifier comprising second and third transistors and to a first filter comprising a first inductor and a first capacitor, whereby a primary regulated output voltage is produced across said first capacitor;

wherein said switched converter further comprises a fourth transistor connected to a second filter comprising a second inductor magnetically coupled to said first inductor and a second capacitor, whereby a secondary regulated output voltage is produced across said second capacitor, said fourth switching element also being connected to a secondary control circuit operable to drive said fourth transistor with a gate voltage, wherein said secondary control circuit is connected to said second winding.

10. A switched converter according to claim 9 wherein said secondary control circuit comprises:

a third capacitor connected to said second winding at a first side of said third capacitor and connected to a first terminal of said fourth transistor at a second side of said third capacitor;

a zener diode connected to said second side of said third capacitor at a cathode side of said zener diode and connected to a second terminal of said fourth transistor at an anode side of said zener diode; and a resistor connected in parallel to said zener diode.

11. A switched converter according to claim 9, wherein said transformer further comprises a third winding connected to said secondary control circuit whereby said control signal is produced as a function of an alternating voltage present on said third winding.

12. A switched converter according to claim 9, wherein said secondary control circuit comprises:

a fifth transistor connected to a first side of a first resistor at a first terminal of said fifth transistor and connected to a second terminal of said fourth transistor at a second terminal of said fifth transistor;

a diode connected to a third terminal of said fifth transistor at a cathode of said diode and connected to a second side of said first resistor at an anode of said diode; and a second resistor connected to said cathode of said diode at a first side of said second resistor and connected to said first terminal of said fourth transistor at a second side of said second resistor.

* * * * *